Figures 1, 2:
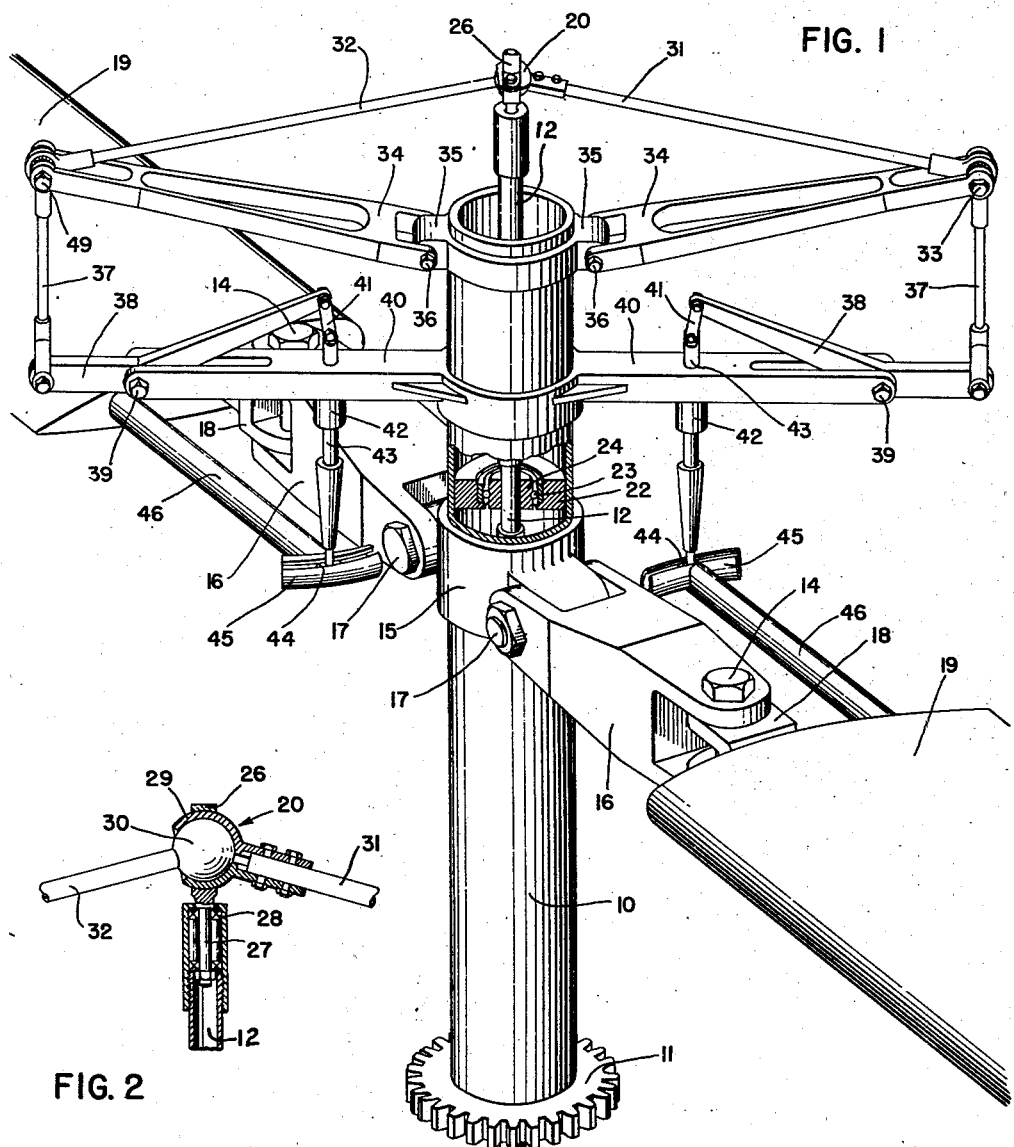

March 25, 1947.   H. HIRSCH   2,418,030

HELICOPTER ROTOR PITCH CONTROL MECHANISM

Filed Sept. 7, 1944   2 Sheets-Sheet 1

INVENTOR.
HAROLD HIRSCH
BY
ATTORNEY

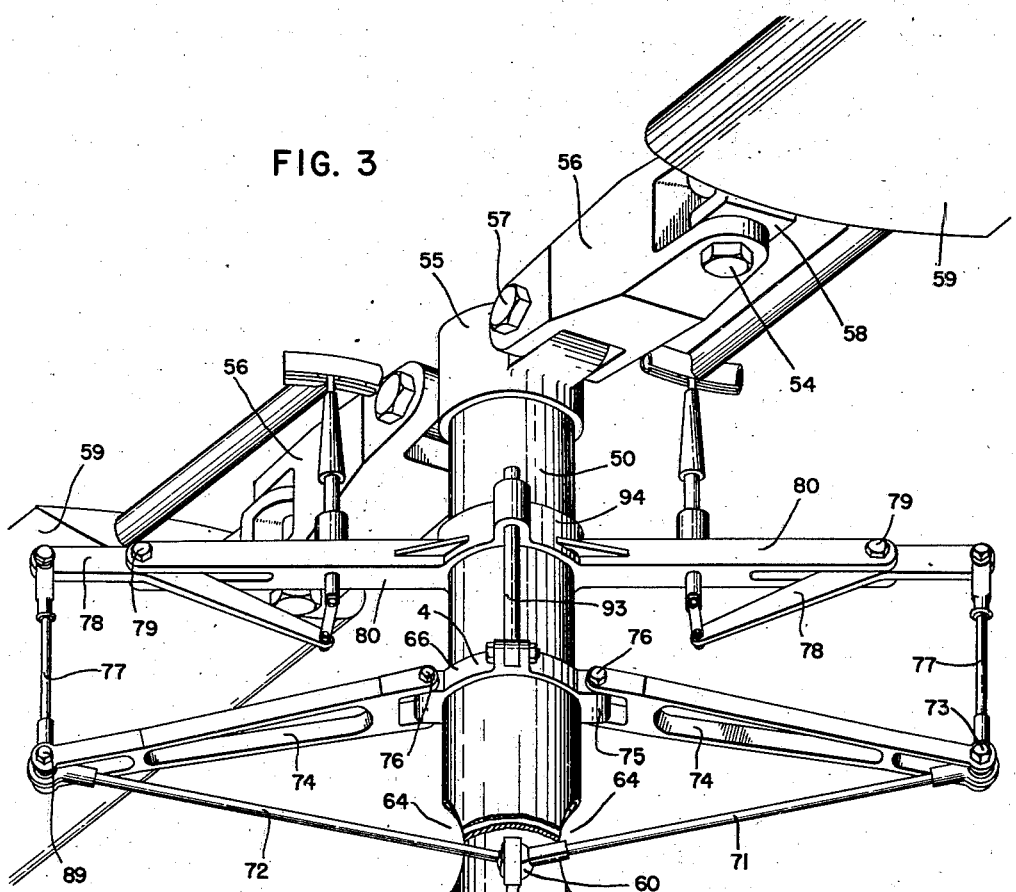
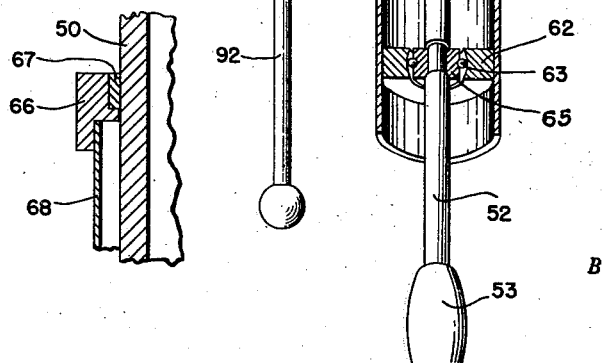
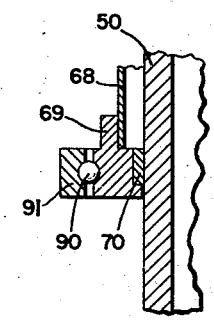
INVENTOR.
HAROLD HIRSCH

Patented Mar. 25, 1947

2,418,030

UNITED STATES PATENT OFFICE 2,418,030

HELICOPTER ROTOR PITCH CONTROL MECHANISM

Harold Hirsch, Buffalo, N. Y., assignor to Curtiss-Wright Corporation, a corporation of Delaware Application September 7, 1944, Serial No. 553,075

8 Claims. (Cl. 244—17)

1

This invention relates to rotary wing aircraft. More particularly, it relates to a means of providing blade pitch control for lifting rotors of rotary wing aircraft, such as helicopters.

Modern rotary wing aircraft, particularly helicopters, are normally provided with means for changing the pitch of the blades, usually in combination with means for allowing free leading and lagging movement and also free flapping movement of the blades. The pitch control is preferably so organized as to provide both for change of pitch of all the blades as a unit, or group pitch change, and for periodic change of pitch of each blade once every revolution of the rotor, or cyclic pitch change. The present invention deals with a novel mechanism for accomplishing both group and cyclic pitch changes in helicopters and other rotary wing aircraft.

The invention is more easily understood by reference to the accompanying drawings, in which: Figure 1 is a perspective view of one embodiment of the invention, with parts broken away for convenience in illustration; Figure 2 is an enlarged elevation of a portion of Figure 1, with parts in cross section; Figure 3 is a perspective view of an alternative form of the invention; and Figures 4 and 5 are enlarged vertical cross sections taken in the regions 4 and 5, respectively, of Figure 3.

Both forms of the invention are shown applied to a two bladed helicopter rotor. It is understood, however, that the invention may be applied to a rotor with any number of blades.

Referring to Figure 1, the rotor mast or hollow shaft 10, which is supported on the aircraft by members (not shown) is caused to rotate by means of a gear 11 which is engaged by a second gear (not shown) driven in conventional fashion by the power plant of the aircraft. A rotor hub 15 is attached to and rotates with shaft 10. A link 16 (one for each rotor blade) is pivoted to the hub 15 by means of the flapping pin 17. A lug 18 attached to blade 19 is pivoted in link 16 through a pin 14 so as to permit lagging motion. Blade 19 is mounted so as to be rotatable about an axis (the pitch change axis) extending spanwise of the blade and comprising a shaft (not shown) attached to lug 18.

A control element 12 with a handle 13 passes through the center of shaft 10 and is supported in a self-aligning bearing 23. The outer race 22 of bearing 23 is affixed in the interior surface of shaft 10, while the element 12 is mounted for sliding movement in the inner race 24 of bearing 23.

2

Referring now to Figure 2, at the upper end of control element 12 there is provided a ball and socket joint 26, on which are pivotally mounted a pair of links 31 and 32. The socket 26 of the ball and socket joint 20 is provided with an extension 27 mounted in bearings 28 so as to permit rotation of joint 20 relative to control element 12. The ball portion of the ball and socket joint 20 is composed of an outer hollow element 29, whose outer surface bears on the inner surface of socket 26, and an inner solid element 30, whose outer surface bears on the inner surface of element 29. Rigidly attached to elements 29 and 30 are two links 31 and 32, respectively. By this construction it is seen that links 31 and 32 are permitted universal pivotal movement with respect to each other and with respect to the socket 26.

The outboard ends of links 31 and 32 terminate with self-aligning bearings pivoted on pins 33 and 49, respectively, which are supported by a second pair of links 34. The inboard ends of links 34 are attached to lugs 35, which are fastened to and caused to rotate with shaft 10, by means of pins 36. It is apparent from the construction shown that each link 34 and pins 33 and 49 are permitted motion only in a plane normal to its associated pin 36. Also pivotally mounted on pins 33 and 49 are a third pair of links 37. Pivotally connected to the lower end of each link 37 is a bell crank 38, which is pivotally mounted, by means of a pin 39, on an arm 40 fastened to and caused to rotate with shaft 10. Each one of a pair of links 41 connects the opposite ends of bell crank 38 with a member 43 mounted for vertical sliding movement with respect to arm 40 and aligned therein by means of a boss 42 integral with arm 40. The lower end of each member 43 is provided with a ball 44 riding in a slotted arcuate guideway 45 attached to the rotor blade by means of a support arm 46. The center of curvature of guideway 45 is located on the axis of pin 14, thus permitting leading and lagging movement of the rotor blades without affecting pitch change. The axis of member 43 also intersects the prolonged axis of pin 17. When member 43 is in such a position that the axis of pin 17 passes through the center of ball 44, it is seen that flapping motion of the blades can occur without affecting pitch change. The elements are preferably so proportioned that this position of member 43 is coincident with the average or normal pitch position of the blades, so that flapping motion has the least possible effect on pitch change.

Group pitch change of the blades may be accomplished by merely raising or lowering joint 20 by vertically displacing the control element 12. Such motion will cause pins 33 and 49 to move along the circle described by links 34 about pins 36. Since links 37 will receive essentially a vertical displacement, this will cause bell cranks 38 to pivot around pins 39 thereby causing members 43 to be displaced essentially vertically. The latter movement is communicated to the trailing edge of blades 19, causing a change of pitch.

Cyclic blade pitch variation is effected by displacing bearing 20 normal to the axis of shaft 12 by causing control element 12 to pivot in bearing 23. Such motion can be obtained by displacing handle 13 horizontally. The amount and rotational position of a blade pitch variation will be determined by the magnitude and direction of the horizontal displacement of handle 13. Considering a two bladed rotor, it is apparent that, as bearing 20 is displaced to the right, pin 33 will be caused to move downwards whereas pin 49, if located 180° from pin 33, as it should be on a two bladed rotor, would be caused to move upwards by a very nearly equal amount. If these points are connected to the rotor blades through suitable linkages such as shown, for example, linkage 37, and member 43 which are of symmetrical construction, the blades controlled by the two linkages will undergo a change in blade pitch of very nearly equal amount but of opposite sense. If a three dimensional system is considered in which bearing 20 is displaced from the axis of shaft 10, and caused to maintain its position in space while shaft 10 is caused to rotate about its axis, it will be found that the blades will undergo a cyclic variation in pitch very nearly sinusoidal in character, and of frequency, once per revolution. The same principle can obviously be applied to a rotor arrangement employing 1, 3 or more blades.

The form of the invention shown in Figure 3 operates on the same general principle as the form shown in Figure 1. The pitch control mechanism, however, is located entirely below the rotor blades, with the result that the mechanism is better adapted to streamlining. A portion of the mast, on the other hand, must be cut out to permit movement of the controlling mechanism, with a resulting structural weakness.

The rotor shaft 50 is rotated through gear 51, in a fashion similar to the form shown in Figure 1. A rotor hub 55 is mounted on the upper end of shaft 50, and rotates in unison therewith. A link 56 (one for each rotor blade) is pivoted to hub 55 by means of flapping pin 57. A lug 58 attached to blade 59 is pivoted in link 56 through pin 54 so as to permit lagging motion, blade 59 being mounted for pitch change as in the form shown in Figure 1. A control element 52 with a handle 53 is supported in the inner race 65 of a self-aligning bearing 63, the outer race 62 being attached to the shaft 50.

The bearing or joint 60 at the upper end of control element 52 is similar in construction and operation to the bearing or joint 20 illustrated in Figure 2. Links 71 and 72 are pivoted in the bearing 60, and are permitted free pivotal motion by means of enlarged lateral openings 64 in the sides of shaft 50. The outboard ends of links 71 and 72 terminate with self-aligning bearings pivoted on pins 73 and 89 respectively, which are supported by a second pair of links 74. The inboard ends of links 74 are attached to lugs 75, which are an integral part of a collar 66, by means of pins 76. It is apparent from the construction shown that each link 74 and pins 73 and 89 are permitted motion only in a plane normal to its associated pin 76. Also mounted on pins 73 and 89 are a third pair of links 77. Pivotally connected to the upper end of each link 77 is a bell crank 78, which is pivotally mounted, by means of a pin 79, on an arm 80 integral with a collar 94 fastened to and caused to rotate with shaft 50. The outer end of bell crank 78 is connected so as to actuate pitch changes in blade 59, in the same fashion as in the form shown in Figure 1.

Referring now to Figures 3, 4 and 5, the collar 66 is mounted for sliding movement on shaft 50, and is prevented from rotating thereon by means of a shaft 93 mounted for sliding movement in a bearing located in collar 94. Collar 66 is supported on shaft 50 by means of a bearing ring 67. Fixedly attached to collar 66 is a sleeve 68, which is attached at its lower end to a second collar 69 slidably supported on shaft 50 by means of a bearing ring 70. Freely mounted for rotational movement, by means of ball bearings 90, with respect to collar 69, is an outer collar 91 to which is attached a control handle 92.

Group pitch change of the blades is effected by merely raising or lowering control handle 92. For example, upward motion of handle 92 will cause pins 73 and 89 to move upwardly. This in turn will cause the inner end of bell cranks 78 to move downwardly, thus increasing the pitch of blades 59.

Cyclic pitch variation is accomplished in a fashion similar to that employed in effecting pitch change in the form shown in Figure 1, that is, by displacement of control element 52 horizontally.

It will be seen that the form shown in Figure 1 employs a single control handle for effecting both group and cyclic pitch change, while in the form shown in Figure 3 a separate control handle is employed for each type of pitch change. It is obvious that these two forms of control handles may be interchanged without departing from the spirit of the invention. Many other changes may be made from the described embodiments, and it is understood that the invention is not to be limited except as defined in the appended claims.

I claim:

1. Control means for varying the pitch of a rotor blade of a rotary wing aircraft mounted for rotational movement on a substantially vertical rotatable shaft, comprising a pair of links extending substantially radially of said shaft and having pivotal connection to each other at their outer ends for relative movement in a substantially vertical plane, one of said links being pivoted at its inner end to an element rotatable with the shaft for movement relative to the shaft in a substantially vertical plane, the other of said links having its inner end in vertically spaced relation to said inner end of the first link, means connected to said links at said pivoted connection for converting vertical movement of said links into a pitch change of said rotor blade, and means for displacing said inner end of the second link radially of said shaft independently of rotation of the latter to effect cyclic pitch change of the rotor blade and axially of said shaft to effect a pitch change of the blade independent of its rotation.

2. Control means for varying the pitch of the rotor blades of rotary wing aircraft mounted for rotational movement on a substantially vertical rotatable shaft, comprising an element displaceable from the axis of said shaft in a substantially horizontal direction independent of the rotation of said shaft, a joint rotatable with said shaft and rotatably mounted on said displaceable element, a plurality of first links pivotally attached at the inner ends thereof to said rotatable joint, a plurality of second links pivotally attached at the inner ends thereof to said shaft and at the outer ends thereof to the outer ends of said first links, means for converting vertical movement of said outer ends of said links into pitch changes of said rotor blades, means for varying the vertical distance between said rotatable joint and said inner ends of said second links whereby to move said outer ends in a substantially vertical direction in unison and thus accomplish group pitch change of said rotor blades, and means for displacing said rotatable joint in a substantially horizontal direction whereby to cyclically move said outer ends in a substantially vertical direction and thus accomplish cyclic pitch change of said rotor blades.

3. Control means for varying the pitch of the rotor blades of rotary wing aircraft mounted for rotational movement on a substantially vertical rotatable shaft, comprising an element displaceable from the axis of said shaft in a substantially horizontal direction independent of the rotation of said shaft and in a vertical direction axially of said shaft, a joint rotatable with said shaft and rotatably mounted on said displaceable element, a plurality of first links pivotally attached at the inner ends thereof to said rotatable joint, a plurality of second links pivotally attached at the inner ends thereof to said shaft and at the outer ends thereof to the outer ends of said first links, means for converting vertical movement of said outer ends of said links into pitch changes of said rotor blades, and means for independently displacing said displaceable element (a) in a substantially vertical direction whereby to move said outer ends in a substantially vertical direction in unison and thus accomplish group pitch change of said rotor blades and (b) in a substantially horizontal direction whereby to cyclically move said outer ends in a substantially vertical direction and thus accomplish cyclic pitch change of said rotor blades.

4. Control means for varying the pitch of the rotor blades of rotary wing aircraft mounted for rotational movement on a substantially vertical rotatable shaft, comprising an element displaceable from the axis of said shaft in a substantially horizontal direction independent of the rotation of said shaft, a joint rotatable with said shaft and rotatably mounted on said displaceable element, a plurality of first links pivotally attached at the inner ends thereof to said rotatable joint, a plurality of second links pivotally attached at the inner ends thereof to said shaft and at the outer ends thereof to the outer ends of said first links, means for converting vertical movement of said outer ends of said links into pitch changes of said rotor blades, means for moving the inner ends of said second links axially of said shaft whereby to move said outer ends in a substantially vertical direction in unison and thus accomplish group pitch change of said rotor blades, and means for displacing said rotatable joint in a substantially horizontal direction whereby to cyclically move said outer ends in a substantially vertical direction and thus accomplish cyclic pitch change of said rotor blades.

5. Control means for varying the pitch of the rotor blades of rotary wing aircraft, comprising a rotatable shaft, a plurality of rotor blades having axes for flapping movement, for leading and lagging movement, and for pitch change, a plurality of arcuate guideways each having its center of curvature located on the leading and lagging axis of a said rotor blade, a plurality of supports each connecting a said arcuate guideway to a said rotor blade at a point horizontally spaced from its pitch change axis, a plurality of substantially vertically aligned bearings mounted in a fixed position with respect to said rotatable shaft, a plurality of members slidable in said bearings each having one end thereof mounted in a said arcuate guideway, and means for vertically sliding said slidable members whereby to accomplish pitch change of said rotor blades.

6. Control means for varying the pitch of the rotor blades of rotary wing aircraft, comprising a rotatable shaft, a plurality of rotor blades having axes for flapping movement, for leading and lagging movement, and for pitch change, a plurality of arcuate guideways each having its center of curvature located on the leading and lagging axis of a said rotor blade, a plurality of supports each connecting a said arcuate guideway to a said rotor blade at a point horizontally spaced from its pitch change axis, a plurality of substantially vertically aligned bearings mounted in a fixed position with respect to said rotatable shaft, a plurality of members slidable in said bearings, a plurality of spherical members each mounted at one end of a said slidable member and riding in a said arcuate guideway, said flapping axis passing through the center of said spherical member in a slidable position of said slidable member, and means for vertically sliding said slidable members whereby to accomplish pitch change of said rotor blades.

7. Control means for varying the pitch of the rotor blades of rotary wing aircraft mounted for rotational movement on a substantially vertical rotatable shaft, said blades having axes for flapping movement, for leading and lagging movement and for pitch change, comprising an element displaceable from the axis of said shaft in a substantially horizontal direction independent of the rotation of said shaft, a joint rotatable with said shaft and rotatably mounted on said displaceable element, a pluraltiy of first links pivotally attached at the inner ends thereof to said rotatable joint, a plurality of second links pivotally attached at the inner ends thereof to said shaft and at the outer ends thereof to the outer ends of said first links, a plurality of arcuate guideways each having its center of curvature located on the leading and lagging axis of a said rotor blade, a plurality of supports each connecting a said arcuate guideway to a said rotor blade at a point horizontally spaced from its pitch change axis, a plurality of substantially vertically aligned bearings mounted in a fixed position with respect to said rotatable shaft, a plurality of members slidable in said bearings each having one end thereof mounted in a said arcuate guideway, means for converting vertical movement of said outer ends of said links into vertical movement of said slidable members, means for varying the vertical distance between said rotatable joint and said inner ends of said second links whereby to move said outer ends substantially in a vertical direction in unison and thus accomplish group pitch change of said rotor blades, and means for displacing said rotatable bearing in a substantially horizontal direction whereby to cyclically move said outer ends in a substantially vertical direction and thus accomplish cyclic pitch change of said rotor blades.

8. Control means for varying the pitch of the rotor blades of rotary wing aircraft mounted for rotational movement on a substantially vertical rotatable shaft, said blades having axes for flapping movement, for leading and lagging movement and for pitch change, comprising an element displaceable from the axis of said shaft in a substantially horizontal direction independent of the rotation of said shaft, a joint rotatable with said shaft and rotatably mounted on said displaceable element, a plurality of first links pivotally attached at the inner ends thereof to said rotatable joint, a plurality of second links pivotally attached at the inner ends thereof to said shaft and at the outer ends thereof to the outer ends of said first links, a pluraltiy of arcuate guideways each having its center of curvature located on the leading and lagging axis of a said rotor blade, a plurality of supports each connecting a said arcuate guideway to a said rotor blade at a point horizontally spaced from its pitch change axis, a plurality of substantially vertically aligned bearings mounted in a fixed position with respect to said rotatable shaft, a plurality of members slidable in said bearings, a plurality of spherical members each mounted at one end of a said slidable member and riding in a said arcuate guideway, said flapping axis passing through the center of said spherical member in a slidable position of said slidable member, means for converting vertical movement of said outer ends of said links into vertical movement of said slidable members, means for varying the vertical distance between said rotatable joint and said inner ends of said second links whereby to move said outer ends substantially in a vertical direction in unison and thus accomplish group pitch change of said rotor blades, and means for displacing said rotatable bearing in a substantially horizontal direction whereby to cyclically move said outer ends in a substantially vertical direction and thus accomplish cyclic pitch change of said rotor blades.

HAROLD HIRSCH.

REFERENCES CITED

The following references are of record in the file of this patent:

UNITED STATES PATENTS

| Number | Name | Date |
|---|---|---|
| 2,080,522 | Wilford | May 18, 1937 |
| 2,088,413 | Hafner | July 27, 1937 |

FOREIGN PATENTS

| Number | Country | Date |
|---|---|---|
| 610,434 | German | Mar. 12, 1935 |